United States Patent
Yamamoto

(10) Patent No.: US 11,677,208 B2
(45) Date of Patent: Jun. 13, 2023

(54) OPTICAL AMPLIFICATION DEVICE AND OPTICAL AMPLIFICATION METHOD

(71) Applicant: FUJITSU LIMITED, Kawasaki (JP)

(72) Inventor: Yusaku Yamamoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 255 days.

(21) Appl. No.: 17/233,592

(22) Filed: Apr. 19, 2021

(65) Prior Publication Data

US 2021/0391681 A1    Dec. 16, 2021

(30) Foreign Application Priority Data

Jun. 12, 2020   (JP) .............................. JP2020-102133

(51) Int. Cl.
  *H01S 3/00* (2006.01)
  *H01S 3/10* (2006.01)
  *H01S 3/23* (2006.01)
  *H01S 3/30* (2006.01)

(52) U.S. Cl.
  CPC ........ *H01S 3/10015* (2013.01); *H01S 3/2316* (2013.01); *H01S 3/30* (2013.01)

(58) Field of Classification Search
  None
  See application file for complete search history.

(56) References Cited

U.S. PATENT DOCUMENTS

2006/0119931 A1* 6/2006 Ghera ..................... H01S 3/302
                                                               257/E31.097
2009/0207482 A1* 8/2009 Izumi ................. H04B 10/2916
                                                               359/334
2014/0126897 A1    5/2014 Nakata
2020/0381888 A1* 12/2020 Mizuno ..................... G02F 1/35

FOREIGN PATENT DOCUMENTS

JP      2003-218796 A    7/2003
JP         3655158 B2 *  1/2005 ............... G02F 1/35
JP      2014-093746 A    5/2014

OTHER PUBLICATIONS

Masahito Morimoto et al., "Co-Propagating Dual-Order Distributed Raman Amplifier Utilizing Incoherent Pumping", IEEE Photonics Technology Letters, vol. 29, No. 7, Apr. 1, 2017, pp. 567-570 (Total 4 pages).

* cited by examiner

*Primary Examiner* — Mark Hellner
(74) *Attorney, Agent, or Firm* — Fujitsu Patent Center

(57) ABSTRACT

An optical amplification device includes a first Raman amplifier outputs a first excitation light to a transmission line in a same direction as a signal light, and a second Raman amplifier outputs a second excitation light to the transmission line in an opposite direction to the signal light. The first Raman amplifier includes a first detector detects a first power of a first transmitted light transmitted through a first optical filter. The second Raman amplifier includes a second detector detects second power of a second transmitted light transmitted through a second optical filter. The first Raman amplifier stops output of the first excitation light when the first power is higher than a threshold. The second Raman amplifier stops output of the second excitation light when the second power is reduced from power of the first excitation light transmitted through the second optical filter.

9 Claims, 10 Drawing Sheets

OPTICAL AMPLIFICATION DEVICE AND OPTICAL AMPLIFICATION METHOD

CROSS-REFERENCE TO RELATED APPLICATION

This application is based upon and claims the benefit of priority of the prior Japanese Patent Application No. 2020-102133, filed on Jun. 12, 2020, the entire contents of which are incorporated herein by reference.

FIELD

The embodiments discussed herein relate to an optical amplification device and an optical amplification method.

BACKGROUND

A Raman amplifier amplifies a signal light using a transmission line through which the signal light is transmitted as an amplification medium by outputting excitation light having a wavelength band on a shorter wavelength side than the signal light to the transmission line. For example, Japanese Laid-open Patent Publication No. 2014-93746 discloses automatic power shutdown (APSD) that stops optical output of a Raman amplifier to suppress leakage of optical power from a failure part of an optical fiber constituting a transmission line in a case where connector disconnection and line disconnection (hereinafter referred to as "transmission line disconnection") of the optical fiber are detected.

Furthermore, Japanese Laid-open Patent Publication No. 2003-218796 discloses a technique of detecting transmission line disconnection on the basis of a reflected light of when an excitation light output from a Raman amplifier performs Fresnel reflection due to the transmission line disconnection, and cutting off the excitation light.

Japanese Laid-open Patent Publication No. 2014-93746 and Japanese Laid-open Patent Publication No. 2003-218796 are disclosed as related art.

SUMMARY

According to an aspect of the embodiments, an optical amplification device includes: a first Raman amplifier configured to output a first excitation light to a transmission line in a same direction as a signal light transmitted in the transmission line to amplify the signal light; and a second Raman amplifier configured to output a second excitation light to the transmission line in an opposite direction to the signal light to amplify the signal light, wherein a first wavelength band of the first excitation light includes a second wavelength band of the second excitation light and is wider than the second wavelength band. The first Raman amplifier includes: a first optical filter configured to cut off the second wavelength band from the second excitation light and/or a first reflected light of the first excitation light, which are input from the transmission line, and a first detector configured to detect first power of a first transmitted light transmitted through the first optical filter. The second Raman amplifier includes a second optical filter configured to cut off the second wavelength band from the first excitation light and/or a second reflected light of the second excitation light, which are input from the transmission line, and a second detector configured to detect second power of a second transmitted light transmitted through the second optical filter. The first Raman amplifier stops output of the first excitation light when the first power is higher than a threshold. The second Raman amplifier stops output of the second excitation light when the second power is reduced from power of the first excitation light transmitted through the second optical filter.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
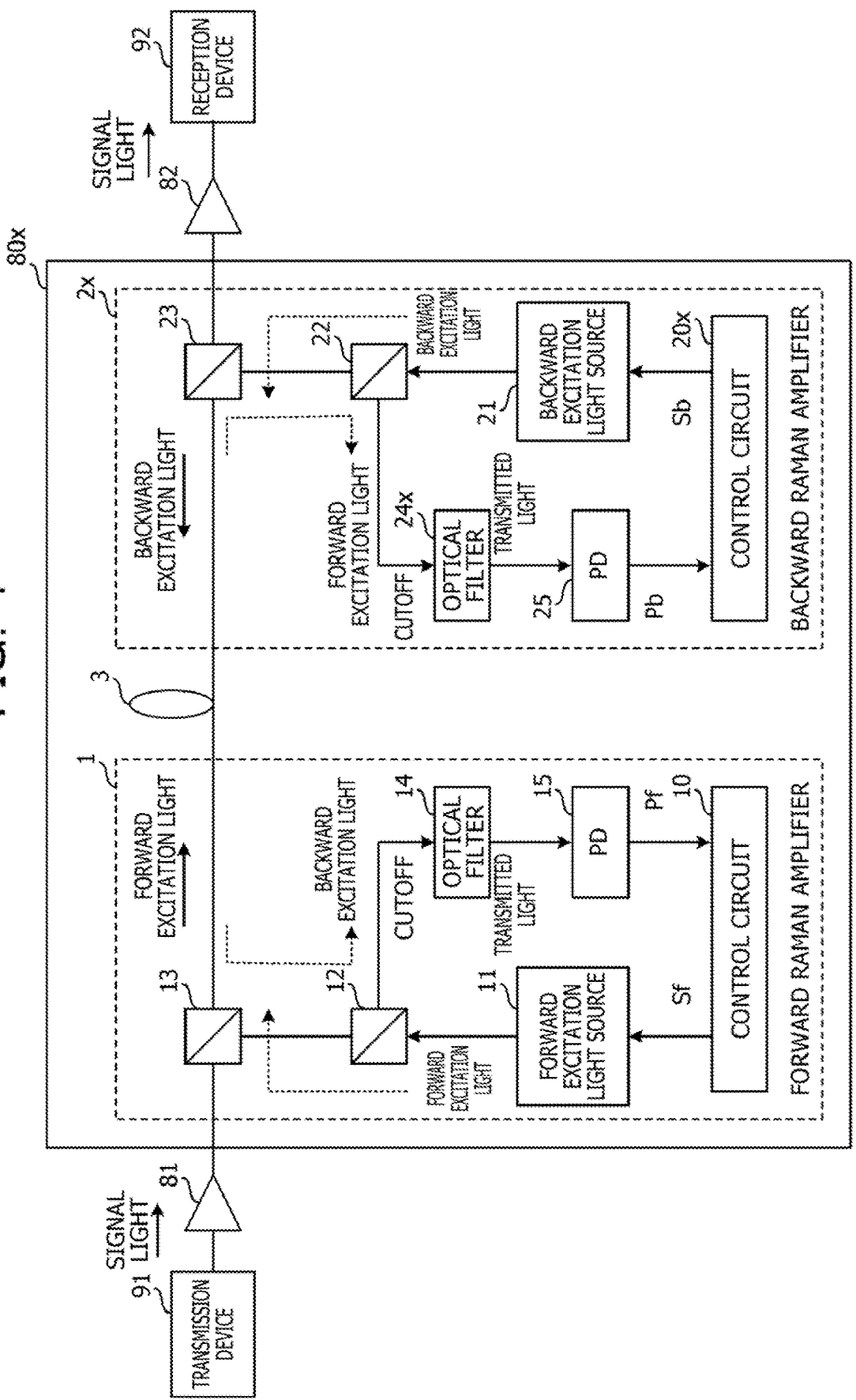
FIG. 1 is a configuration diagram illustrating a comparative example of a bidirectional Raman amplification device.

To effectively amplify a signal light, there are some cases where a forward Raman amplifier that outputs an excitation light in the same direction as the signal light (hereinafter the excitation light is referred to as "forward excitation light") and a backward Raman amplifier that outputs an excitation light in an opposite direction to the signal light (hereinafter the excitation light is referred to as "backward excitation light") are respectively provided on an upstream side and on a downstream side of the transmission line.

When the transmission line disconnection does not occur, the backward excitation light is input from the backward Raman amplifier to the forward Raman amplifier, and the forward excitation light is input from the forward Raman amplifier to the backward Raman amplifier. Furthermore, when the transmission line disconnection occurs, a reflected light of the forward excitation light is input from the failure part to the forward Raman amplifier, and a reflected light of the backward excitation light is input from the failure part to the backward Raman amplifier, due to the Fresnel reflection.

The forward Raman amplifier is provided with an optical filter that cuts off the wavelength band of the backward excitation light, and the backward Raman amplifier is provided with an optical filter that cuts off the wavelength band of the forward excitation light. Therefore, when the transmission line disconnection does not occur, the forward Raman amplifier and the backward Raman amplifier do not erroneously detect the transmission line disconnection by the backward excitation light and the forward excitation light, and do not cut off the forward excitation light and the backward excitation light, respectively. Meanwhile, when the transmission line disconnection occurs, the forward Raman amplifier and the backward Raman amplifier detect the transmission line disconnection by the respective reflected lights of the forward excitation light and the backward excitation light transmitted through the optical filters, and can cut off the forward excitation light and the backward excitation light, respectively.

For example, to suppress the influence of relative intensity noise (RIN) on the signal light due to power variation in the forward excitation light, the wavelength band of the forward excitation light may have a wide bandwidth including the wavelength band of the backward excitation light.

In this case, when the transmission line disconnection occurs, the optical filter of the backward Raman amplifier cuts off the reflected light of the backward excitation light from the failure part because of having the wide cutoff band according to the forward excitation light. Therefore, the backward Raman amplifier is not able to detect the transmission line disconnection by the reflected light and is not able to cut off the backward excitation light.

Therefore, an object of the embodiments is to provide an optical amplification device and an optical amplification method capable of cutting off a forward excitation light and a backward excitation light even in the case of having a wide bandwidth including the forward excitation light and the backward excitation light.

(Configuration of Comparative Example of Bidirectional Raman Amplification Device)

FIG. 1 is a configuration diagram illustrating a comparative example of a bidirectional Raman amplification device 80$x$. The bidirectional Raman amplification device 80$x$ is connected to a transmission line 3 connecting a transmission device 91 and a reception device 92. A signal light is transmitted in the transmission line 3 from the transmission device 91 to the reception device 92. The signal light is, for example, a wavelength multiplexed signal light including a plurality of wavelength lights.

The transmission line 3 includes, for example, a plurality of optical fibers, optical connectors (not illustrated), and the like. The optical connector connects optical fibers to each other.

Erbium doped fiber amplifiers (EDFAs) 81 and 82 are connected to the transmission line 3 in the vicinities of the transmission device 91 and the reception device 92, respectively. The EDFAs 81 and 82 amplify the signal light. The bidirectional Raman amplification device 80$x$ is connected between the EDFAs 81 and 82.

The bidirectional Raman amplification device 80$x$ includes a forward Raman amplifier 1 and a backward Raman amplifier 2$x$. The forward Raman amplifier 1 outputs a forward excitation light to the transmission line 3 in the same direction as the signal light. When the forward excitation light enters the transmission line 3, induced Raman scattering occurs and the signal light is Raman-amplified. The backward Raman amplifier 2$x$ outputs a backward excitation light to the transmission line 3 in the direction opposite to the signal light. When the backward excitation light enters the transmission line 3, induced Raman scattering occurs and the signal light is Raman-amplified.

The forward Raman amplifier 1 is provided on an upstream side of the backward Raman amplifier 2$x$ in a signal light transmission direction. Therefore, the backward excitation light is input from the backward Raman amplifier 2$x$ to the forward Raman amplifier 1, and the forward excitation light is input from the forward Raman amplifier 1 to the backward Raman amplifier 2$x$.

The forward Raman amplifier 1 includes a control circuit 10, a forward excitation light source 11, an optical coupler 12, a wavelength divisional multiplexing (WDM) coupler 13, an optical filter 14, and a photo diode (PD) 15.

The forward excitation light source 11 is, for example, a laser diode (LD) and outputs the forward excitation light. The optical coupler 12 guides the forward excitation light input from the forward excitation light source 11 to the WDM coupler 13. The WDM coupler 13 guides the forward excitation light input from the optical coupler 12 to the transmission line 3, and guides the backward excitation light input from the transmission line 3 to the optical coupler 12. Furthermore, the WDM coupler 13 does not allow an input of the signal light from the transmission line 3 to the optical coupler 12, and guides the signal light and the forward excitation light to the backward Raman amplifier 2$x$ through the transmission line 3.

The optical coupler 12 guides the backward excitation light input from the WDM coupler 13 to the optical filter 14. The optical filter 14 includes a cutoff band corresponding to the wavelength band of the backward excitation light, and cuts off the backward excitation light. The transmitted light transmitted through the optical filter 14 is input to the PD 15.

The PD 15 detects power Pf of the transmitted light. The control circuit 10 acquires the power Pf of the transmitted light from an output signal of the PD 15. When the transmission line disconnection does not occur, the optical filter 14 cuts off the backward excitation light, so that the power Pf of the transmitted light becomes substantially 0.

The control circuit 10 controls an optical output of the forward excitation light source 11 by a control signal Sf on the basis of the power Pf of the transmitted light. When the power Pf of the transmitted light is higher than a threshold THf, the control circuit 10 determines that the transmission line disconnection of the transmission line 3 has occurred, and shuts down the forward excitation light source 11 to cut off the forward excitation light. In this way, the forward excitation light source 11 stops the output of the forward excitation light.

In the present example, since the power Pf of the transmitted light is substantially 0, the control circuit 10 determines that the transmission line disconnection of the transmission line 3 has not occurred because power Pb of the transmitted light is equal to or less than the threshold THf and maintains the output of the forward excitation light source 11.

The backward Raman amplifier 2$x$ includes a control circuit 20$x$, a backward excitation light source 21, an optical coupler 22, a WDM coupler 23, an optical filter 24$x$, and a PD 25.

The backward excitation light source 21 is, for example, an LD, and outputs backward excitation light. The optical coupler 22 guides the backward excitation light input from the backward excitation light source 21 to the WDM coupler 23. The WDM coupler 23 guides the backward excitation light input from the optical coupler 22 to the transmission line 3, and guides the forward excitation light input from the transmission line 3 to the optical coupler 22. Furthermore, the WDM coupler 23 does not allow the signal light from the transmission line 3 to be input to the optical coupler 22, but guides the signal light and the backward excitation light to the EDFA 82 through the transmission line 3.

The optical coupler 22 guides the forward excitation light input from the WDM coupler 23 to the optical filter 24$x$. The optical filter 24x includes a cutoff band corresponding to the wavelength band of the forward excitation light, and cuts off an optical component corresponding to the cutoff band. Therefore, there is substantially no transmitted light that passes through the optical filter 24x and is input to the PD 25.

The PD 25 detects the power Pb of the transmitted light. The control circuit 20x acquires the power Pb of the transmitted light from an output signal of the PD 25. When the transmission line disconnection does not occur, the optical filter 24x cuts off the forward excitation light, so that the power Pb of the transmitted light becomes substantially 0.

The control circuit 20x controls an optical output of the backward excitation light source 21 by a control signal Sb based on the power Pb of the transmitted light. When the power Pb of the transmitted light is higher than a threshold Tb', the control circuit 20x determines that the transmission line disconnection of the transmission line 3 has occurred, and shuts down the backward excitation light source 21 to cut off the backward excitation light. In this way, the backward excitation light source 21 stops the output of the backward excitation light.

In the present example, since the power Pb of the transmitted light is substantially 0, the control circuit 20x determines that the transmission line disconnection of the transmission line 3 has not occurred because the power Pb of the transmitted light is equal to or less than a threshold THb' and maintains the output of the backward excitation light source 21.

(Forward Excitation Light and Backward Excitation Light)

Figure 2:
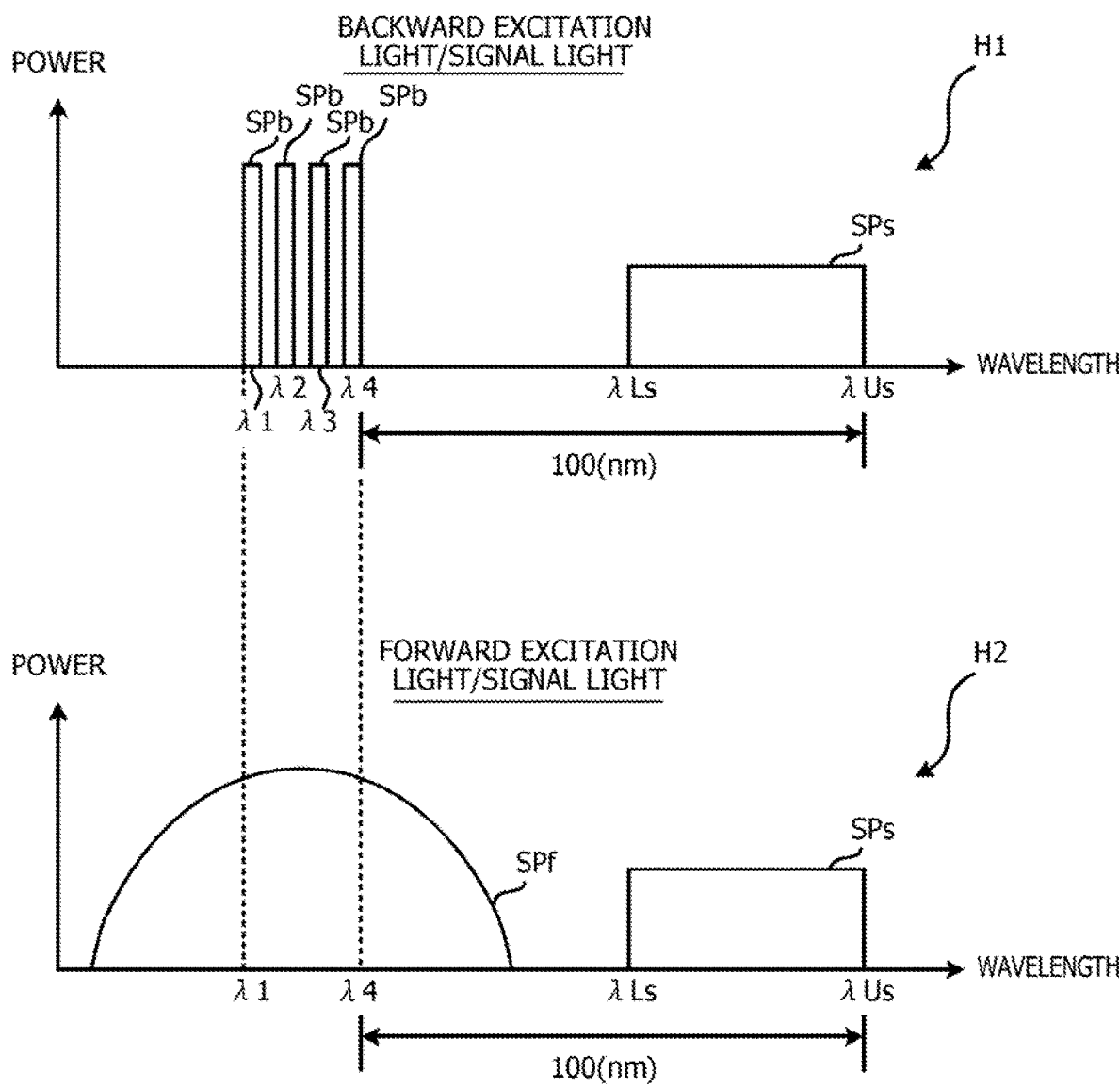
FIG. 2 is a spectrum diagram illustrating forward excitation light and backward excitation light.

FIG. 2 is a spectrum diagram illustrating the forward excitation light and the backward excitation light. In FIG. 2, the horizontal axis represents the wavelength and the vertical axis represents the power. Reference numeral H1 indicates a wavelength band SPb of the backward excitation light and a wavelength band SPs of the signal light. Reference numeral H2 indicates a wavelength band SPf of the forward excitation light and the wavelength band SPs of the signal light.

In the present example, the signal light includes the wavelength band SPs of wavelengths $\lambda$Ls to $\lambda$Us. An example of the signal light includes, but is not limited to, a wavelength multiplexed signal light in a C band. The respective wavelength bands SPf and SPb of the forward excitation light and the backward excitation light are set at intervals of 100 (nm) on a short wavelength side of the wavelength band SPs of the signal light. Therefore, the forward Raman amplifier 1 and the backward Raman amplifier 2x can appropriately Raman-amplify the signal light by the forward excitation light and the backward excitation light, respectively.

The wavelength band SPb of the backward excitation light is divided into four discontinuous regions of central wavelengths of $\lambda$1, $\lambda$2, $\lambda$3, and $\lambda$4 having a fixed bandwidth. Note that the number of regions of the wavelength band SPb of the backward excitation light is not limited to four, and is appropriately determined according to the band design.

The wavelength band SPf of the forward excitation light has a wide bandwidth including the wavelength band SPb of the backward excitation light in order to suppress the influence of the RIN due to the power variation in the forward excitation light on the signal light. The power of the forward excitation light is higher toward the center of the wavelength band SPf, and is lower toward both ends of the wavelength band SPf. An example of the forward excitation light source 11 that outputs such a forward excitation light includes "i-pump" described in the following reference, for example. The "i-pump" can output wideband light like an amplified spontaneous emission (ASE) light source.

REFERENCE

"Co-Propagating Dual-Order Distributed Raman Amplifier Utilizing Incoherent Pumping", Masahito Morimoto et al., IEEE PHOTONICS TECHNOLOGY LETTERS, VOL. 29, NO. 7, Apr. 1, 2017

As described above, the wavelength band of the forward excitation light includes the wavelength band of the backward excitation light and is wider than the wavelength of the backward excitation light. Furthermore, the wavelength band SPb of the backward excitation light has at least the same bandwidth as the signal light on the short wavelength side of the wavelength band SPs of the signal light. Therefore, the backward Raman amplifier 2x can Raman-amplify the signal light more effectively than when the wavelength band SPb of the backward excitation light is narrower than the wavelength band SPs of the signal light. Note that the wavelength band of the forward excitation light is an example of a first wavelength band, and the wavelength band of the backward excitation light is an example of a second wavelength band.

(Operation when Transmission Line Disconnection Occurs in Comparative Example)

Figure 3:
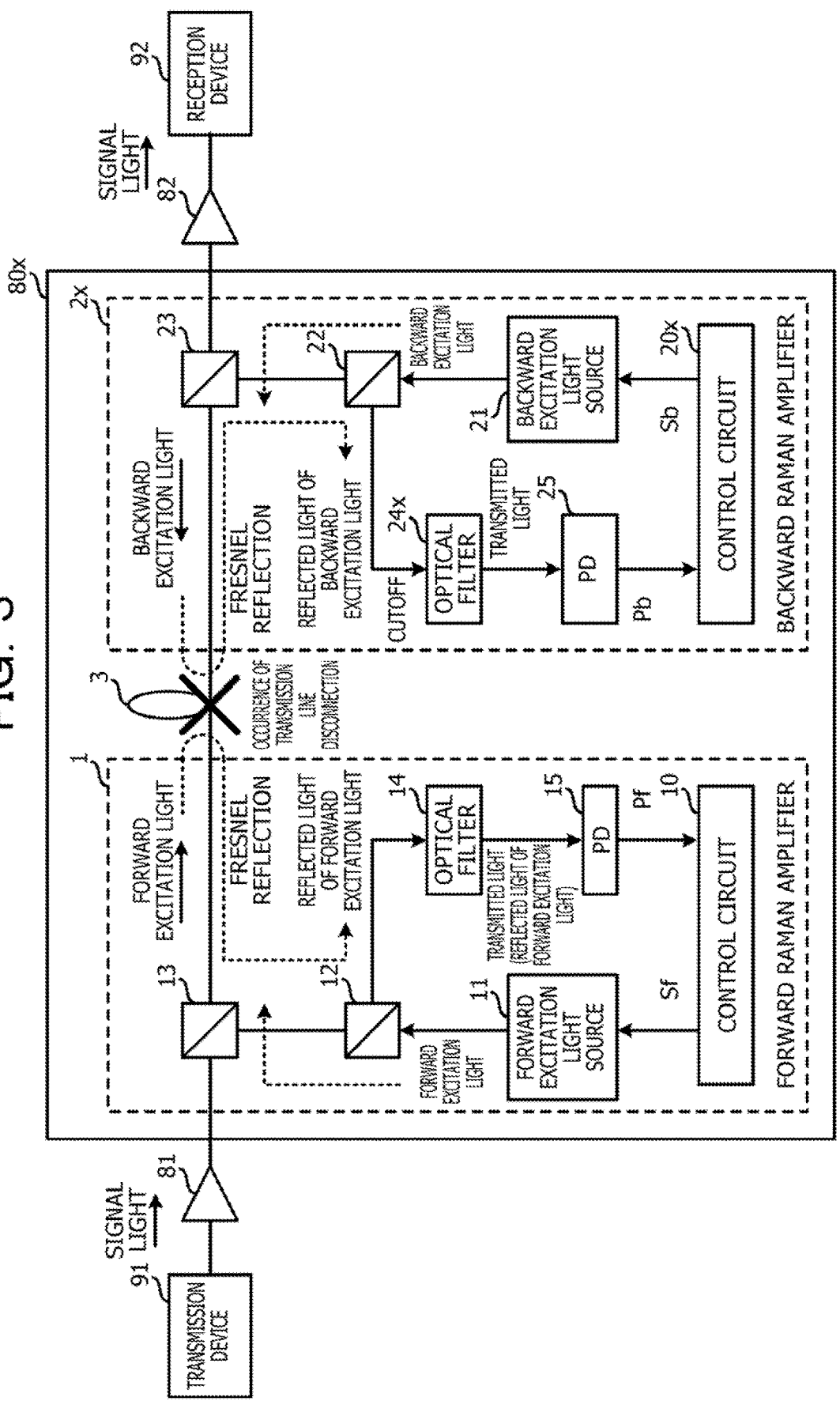
FIG. 3 is a diagram illustrating an operation example of the bidirectional Raman amplification device of the comparative example when transmission line disconnection has occurred.

FIG. 3 is a diagram illustrating an operation example of the bidirectional Raman amplification device 80x of the comparative example when transmission line disconnection has occurred. In FIG. 3, components common to those in FIG. 1 are denoted by the same reference numerals, and description thereof will be omitted.

When the transmission line disconnection occurs in the transmission line 3, the forward excitation light and the backward excitation light are Fresnel-reflected at a failure occurrence point (see the cross mark). The reflected light of the forward excitation light is transmitted through the transmission line 3 in the opposite direction to the signal light and input to the WDM coupler 13, and the reflected light of the backward excitation light is transmitted through the transmission line 3 in the same direction as the signal light and input to the WDM coupler 23.

The WDM coupler 13 guides the reflected light of the forward excitation light from the transmission line 3 to the optical coupler 12. The optical coupler 12 guides the reflected light of the forward excitation light to the optical filter 14.

Furthermore, the optical coupler 12 guides the forward excitation light to the transmission line 3, and guides the backward excitation light and the reflected light of the forward excitation light from the transmission line 3 to the optical filter 14. Therefore, the forward Raman amplifier 1 can input and output the forward excitation light, the backward excitation light, and the reflected light of the forward excitation light to and from the transmission line 3 via a common waveguide.

In this way, the backward excitation light is input from the transmission line 3 to the optical filter 14 when the transmission line disconnection does not occur, and the reflected light of the forward excitation light is input to the optical filter 14 when the transmission line disconnection occurs.

The wavelength band of the forward excitation light has a wide bandwidth including the backward excitation light. Therefore, the optical filter 14 cuts off the optical component corresponding to the cutoff band but transmits the remaining optical component, of the reflected light of the forward excitation light. The transmitted light transmitted through the optical filter 14, that is, a part of the reflected light is input to the PD 15.

The PD 15 detects the power Pf of the transmitted light of the optical filter 14. When the power Pf of the transmitted light, that is, the power Pf of the reflected light of the forward excitation light becomes higher than the threshold THf, the control circuit 10 determines that the transmission line disconnection has occurred and shuts down the forward excitation light source 11.

Furthermore, the WDM coupler 23 guides the reflected light of the backward excitation light from the transmission line 3 to the optical coupler 22. The optical coupler 22 guides the reflected light of the backward excitation light to the optical filter 24$x$.

Furthermore, the optical coupler 22 guides the backward excitation light to the transmission line 3, and guides the forward excitation light and the reflected light of the backward excitation light from the transmission line 3 to the optical filter 24$x$. Therefore, the backward Raman amplifier 2$x$ can input and output the forward excitation light, the backward excitation light, and the reflected light of the backward excitation light to and from the transmission line 3 via a common waveguide.

In this way, the backward excitation light is input from the transmission line 3 to the optical filter 24$x$ when the transmission line disconnection does not occur, and the reflected light of the backward excitation light is input to the optical filter 24$x$ when the transmission line disconnection occurs.

The optical filter 24$x$ has a cutoff band corresponding to the wavelength band of the forward excitation light wider than the optical filter 14 of the forward Raman amplifier 1. Therefore, the optical filter 24$x$ cuts off the reflected light of the backward excitation light. Therefore, there is substantially no transmitted light transmitted through the optical filter 24$x$ and input to the PD 25, and the control circuit 20$x$ is not able to detect the input of the reflected light of the backward excitation light from the power of the transmitted light. Therefore, the control circuit 20$x$ is not able to determine the occurrence of the transmission line disconnection.

(Operation of Optical Filter in Comparative Example)

Figure 4:
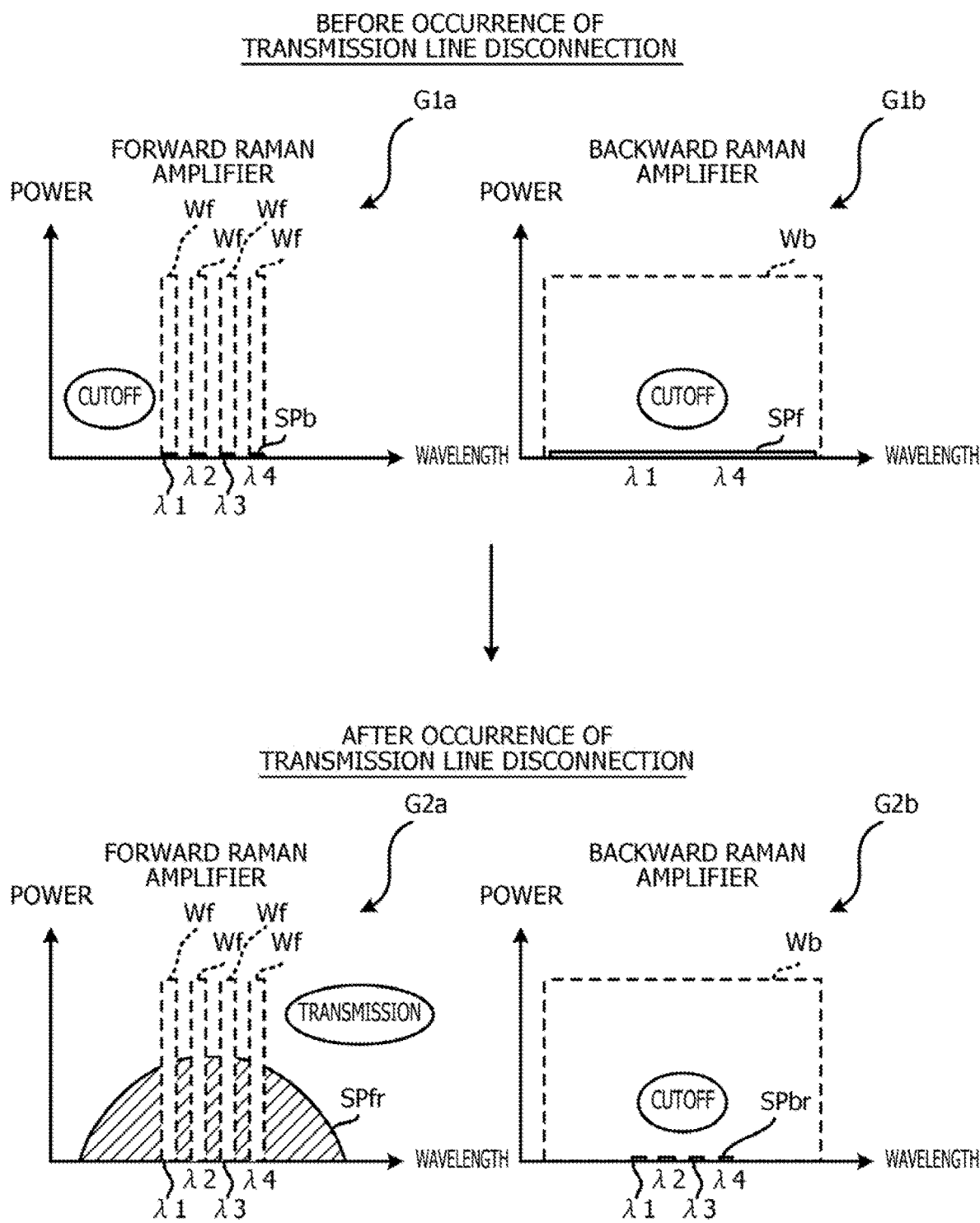
FIG. 4 is a spectrum diagram illustrating operation of optical filters in the comparative example.

FIG. 4 is a spectrum diagram illustrating operation of the optical filters 14 and 24$x$ in the comparative example. In FIG. 3, the horizontal axis represents the wavelength and the vertical axis represents the power.

Reference numeral G1$a$ indicates the operation of the optical filter 14 of the forward Raman amplifier 1 before the occurrence of the transmission line disconnection, and reference numeral G1$b$ indicates the operation of the optical filter 24$x$ of the backward Raman amplifier 2$x$ before the occurrence of the transmission line disconnection.

In the present example, the optical filter 14 of the forward Raman amplifier 1 has a cutoff band Wf including four discontinuous regions of the center wavelengths $\lambda 1$, $\lambda 2$, $\lambda 3$, and $\lambda 4$ having a fixed bandwidth. For example, the optical filter 14 of the forward Raman amplifier 1 has the cutoff band Wf that matches the wavelength band SFb of the backward excitation light.

Furthermore, the optical filter 24$x$ of the backward Raman amplifier 2$x$ includes a cutoff band Wb including the wavelength band SFb of the center wavelengths $\lambda 1$, $\lambda 2$, $\lambda 3$, and $\lambda 4$ of the backward excitation light. For example, the optical filter 24$x$ of the backward Raman amplifier 2$x$ includes the cutoff band Wb that matches the wavelength band SPf of the forward excitation light.

When the transmission line disconnection does not occur, the backward excitation light is input from the backward Raman amplifier 2$x$ to the forward Raman amplifier 1, and the forward excitation light is input from the forward Raman amplifier 1 to the backward Raman amplifier 2$x$. The optical filter 14 of the forward Raman amplifier 1 cuts off the backward excitation light by the cutoff band Wf, and the optical filter 24$x$ of the backward Raman amplifier 2$x$ cuts off the forward excitation light by the cutoff band Wb.

Therefore, the respective power Pf and Pb of the transmitted lights of the optical filters 14 and 24$x$ are substantially 0. Therefore, when the transmission line disconnection does not occur, the control circuits 10 and 20$x$ do not erroneously detect the transmission line disconnection by the backward excitation light and the forward excitation light and do not cut off the forward excitation light and the backward excitation light, respectively.

Reference numeral G2$a$ indicates the operation of the optical filter 14 of the forward Raman amplifier 1 after the occurrence of the transmission line disconnection, and reference numeral G2$b$ indicates the operation of the optical filter 24$x$ of the backward Raman amplifier 2$x$ after the occurrence of the transmission line disconnection. When the transmission line disconnection occurs, a reflected light of the forward excitation light is input from the failure part to the forward Raman amplifier 1, and the reflected light of the backward excitation light is input from the failure part to the backward Raman amplifier 2$x$, due to the Fresnel reflection.

The cutoff band Wf of the optical filter 14 of the forward Raman amplifier 1 partially overlaps with the wavelength band SPfr of the reflected light of the forward excitation light in the vicinities of the center wavelengths $\lambda 1$, $\lambda 2$, $\lambda 3$, and $\lambda 4$, but there are also some regions where the cutoff band Wf does not overlap with the wavelength band SPfr. Therefore, the optical filter 14 transmits the optical component of the reflected light of the forward excitation light, the component not overlapping with the cutoff band Wf.

Therefore, the PD 15 detects a part of the power Pf of the reflected light of the forward excitation light as transmitted light. Therefore, in the case where the power Pf of the transmitted light of the optical filter 14 becomes higher than the threshold THf, the control circuit 10 can detect the transmission line disconnection and cut off the forward excitation light.

Since the cutoff band Wb of the optical filter 24$x$ of the backward Raman amplifier 2$x$ has a wide bandwidth in accordance with the wavelength band SPf of the forward excitation light, the cutoff band Wb includes a wavelength band SPbr of the reflected light of the backward excitation light. Therefore, the optical filter 24$x$ does not transmit the reflected light of the backward excitation light at all.

Therefore, the power Pb of the transmitted light of the optical filter 24$x$ becomes substantially 0, which is equal to or less than the threshold THb. Therefore, the control circuit 20$x$ is not able to detect the transmission line disconnection even though the transmission line disconnection has occurred, so that the backward excitation light is not able to be cut off.

(Configuration of Embodiment of Bidirectional Raman Amplification Device)

Figure 5:
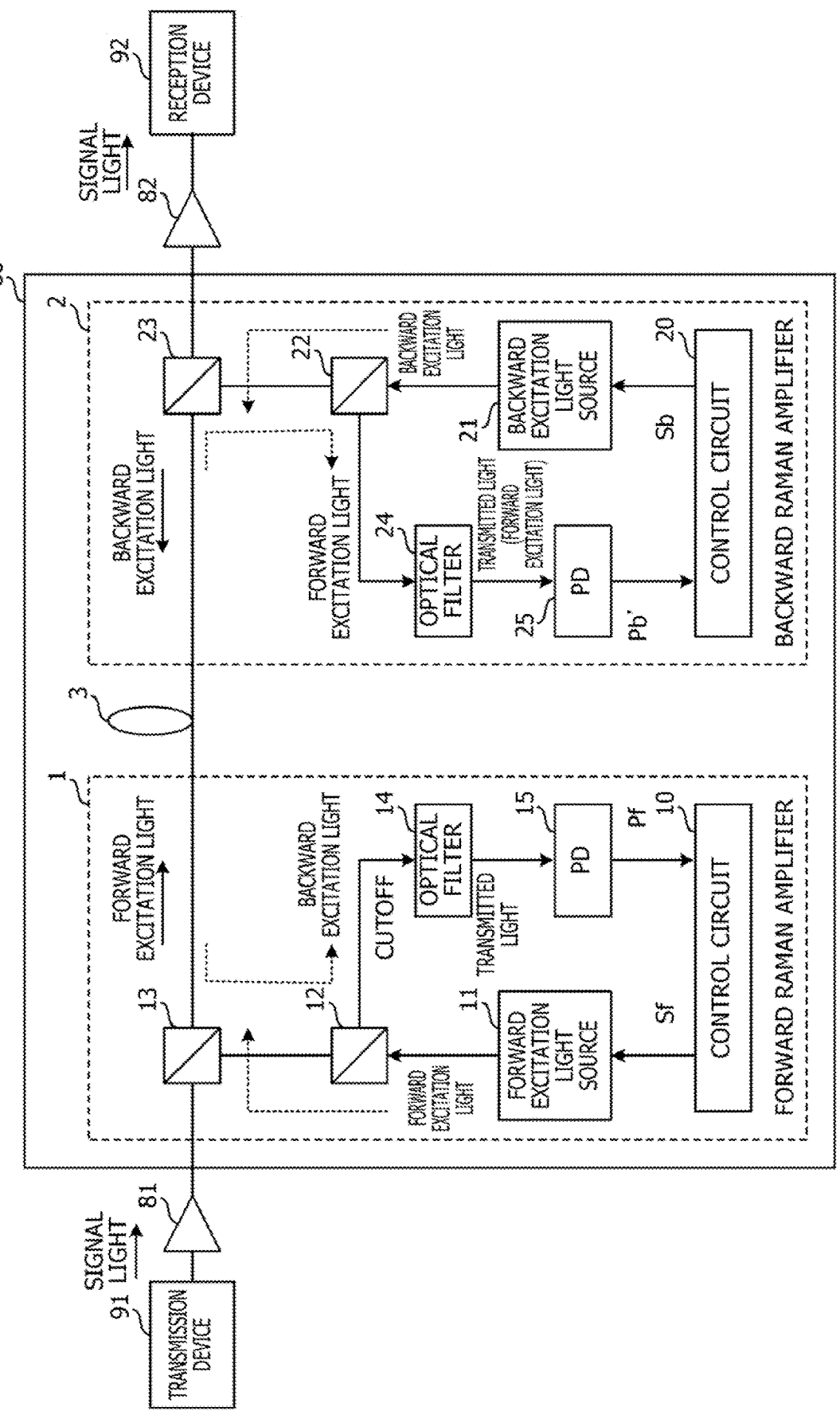
FIG. 5 is a configuration diagram illustrating an embodiment of a bidirectional Raman amplification device.

FIG. 5 is a configuration diagram illustrating an embodiment of a bidirectional Raman amplification device 80. In FIG. 5, components common to those in FIG. 1 are denoted by the same reference numerals, and description thereof will be omitted. Note that an operation of the bidirectional Raman amplification device 80 of the embodiment to be described below is an example of an optical amplification method.

The bidirectional Raman amplification device 80 is an example of an optical amplification device, and is connected to a transmission line 3 connecting a transmission device 91 and a reception device 92. Note that the operation of the bidirectional Raman amplification device 80 to be described below is an example of the optical amplification method.

The bidirectional Raman amplification device 80 includes a forward Raman amplifier 1 and a backward Raman amplifier 2. The forward Raman amplifier 1 is an example of a first Raman amplifier, and amplifies a signal light by outputting a forward excitation light to the transmission line 3 in the same direction as the signal light. The backward Raman amplifier 2 outputs a backward excitation light to the transmission line 3 in a direction opposite to the signal light. When the backward excitation light enters the transmission line 3, induced Raman scattering occurs and the signal light is Raman-amplified. Note that the backward Raman amplifier 2 is an example of a second Raman amplifier.

The forward Raman amplifier 1 includes a control circuit 10, a forward excitation light source 11, an optical coupler 12, a WDM coupler 13, an optical filter 14, and a PD 15. The forward Raman amplifier 1 operates in a similar manner to the comparative example. Here, the optical filter 14 is an example of a first optical filter, and a transmitted light transmitted through the optical filter 14 is an example of a first transmitted light. The PD 15 is an example of a first detection unit that detects power Pf of the transmitted light transmitted through the optical filter 14. The optical coupler 12 is an example of a first light guide.

The backward Raman amplifier 2 includes a control circuit 20, a backward excitation light source 21, an optical coupler 22, a WDM coupler 23, an optical filter 24, and a PD 25. The optical filter 24 is an example of a second optical filter, and has a cutoff band different from the optical filter 24x of the comparative example. Furthermore, unlike the control circuit 20x of the comparative example, the control circuit 20 cuts off the backward excitation light in a case where power Pb' of a transmitted light of the optical filter 24 becomes lower than a threshold THb. Note that the optical coupler 22 is an example of a second light guide.

The forward excitation light is input from the forward Raman amplifier 1 to the optical filter 24. The optical filter 24 has a cutoff band corresponding to the wavelength band of the backward excitation light, similarly to the optical filter 14 of the forward Raman amplifier 1. The forward excitation light has a wide wavelength band including the backward excitation light.

Therefore, the optical filter 24 cuts off an optical component corresponding to the cutoff band but transmits the remaining optical component, of the forward excitation light. The transmitted light transmitted through the optical filter 24, that is, a part of the forward excitation light is input to the PD 25. Note that the transmitted light transmitted through the optical filter 24 is an example of a second transmitted light.

The PD 25 detects the power Pb' of the transmitted light of the optical filter 24. When the power Pb' of the transmitted light is higher than the threshold THb, the control circuit 20 determines that transmission line disconnection has not occurred and maintains an output of the backward excitation light without shutting down the backward excitation light source 21. Note that the PD 25 is an example of a second detection unit that detects the power Pb' of the transmitted light transmitted through the optical filter 24.

(Operation when Transmission Line Disconnection Occurs in Embodiment)

Figure 6:
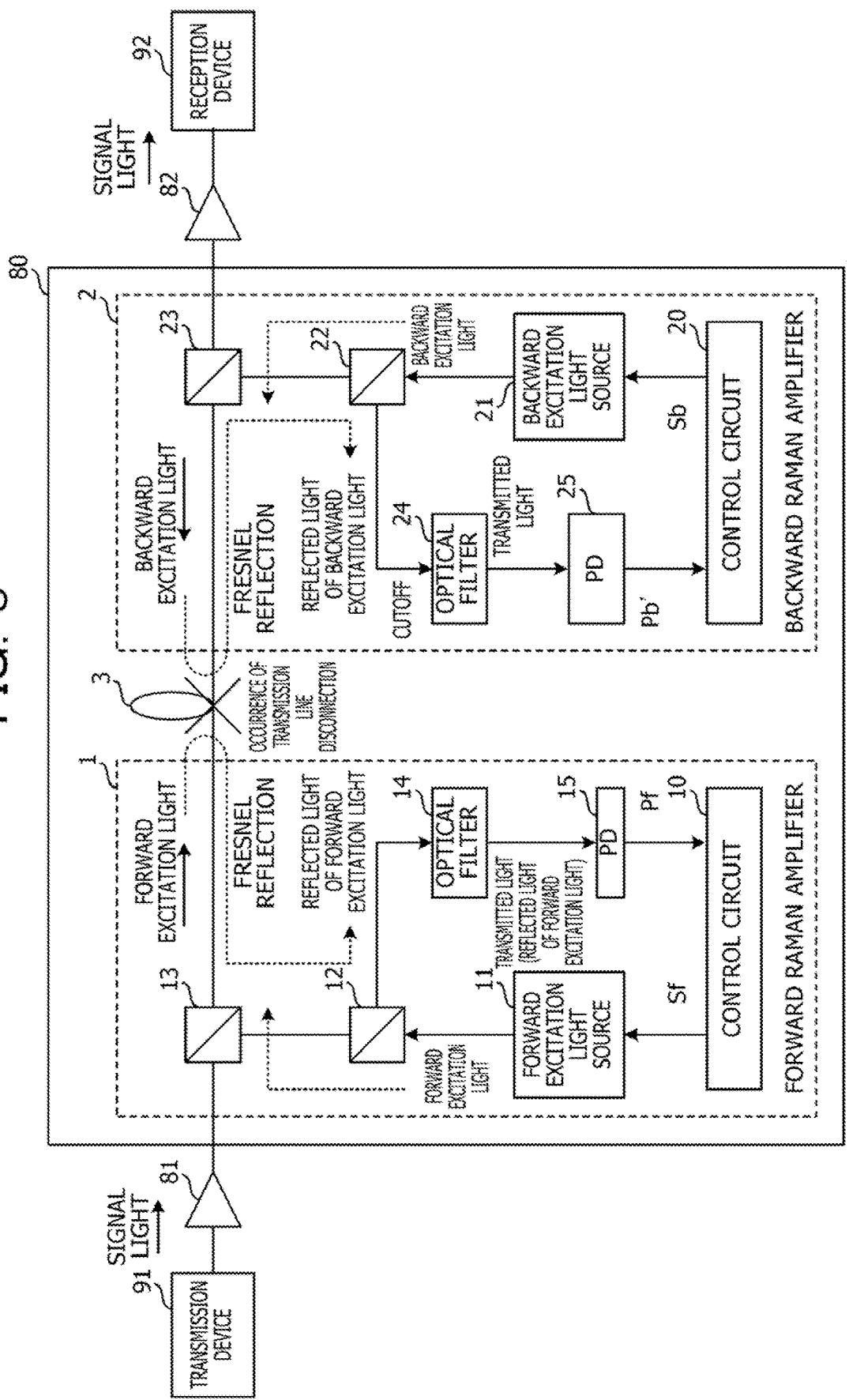
FIG. 6 is a diagram illustrating an operation example of the bidirectional Raman amplification device of the embodiment when transmission line disconnection has occurred.

FIG. 6 is a diagram illustrating an operation example of the bidirectional Raman amplification device 80 of the embodiment when transmission line disconnection has occurred. In FIG. 6, components common to those in FIG. 5 are denoted by the same reference numerals, and description thereof will be omitted.

When the transmission line disconnection occurs in the transmission line 3, the forward excitation light and the backward excitation light are Fresnel-reflected at a failure occurrence point (see the cross mark). A reflected light of the forward excitation light is transmitted through the transmission line 3 in the opposite direction to the signal light and input to the WDM coupler 13, and a reflected light of the backward excitation light is transmitted through the transmission line 3 in the same direction as the signal light and input to the WDM coupler 23.

The reflected light of the backward excitation light is input from the failure occurrence point of the transmission line 3 to the optical filter 24. The optical filter 24 has a cutoff band corresponding to the wavelength band of the backward excitation light. Therefore, the optical filter 24 cuts off the reflected light of the backward excitation light. Therefore, there is substantially no transmitted light that passes through the optical filter 24 and is input to the PD 25. Therefore, the power Pb' of the transmitted light is substantially zero.

As described above, the power Pb' of the transmitted light of the optical filter 24 of the embodiment is equal to the power of the forward excitation light transmitted through the optical filter 24 before occurrence of the transmission line disconnection, and substantially becomes 0 after occurrence of the transmission line disconnection. Therefore, occurrence of the transmission line disconnection can be determined by detecting a change in the power Pb' of the transmitted light. In contrast, the power Pb' of the optical filter 24x of the comparative example is substantially 0 on a fixed basis before and after occurrence of the transmission line disconnection, and is not able to determine the occurrence of the transmission line disconnection.

The control circuit 20 stops the output of the backward excitation light when the power Pb' of the transmitted light detected by the PD 15 decreases from the power of the forward excitation light transmitted through the optical filter. The power Pb' of the transmitted light is equal to the power of the forward excitation light transmitted through the optical filter before the transmission line disconnection, but becomes substantially 0 after the transmission line disconnection. Therefore, when the power Pb' of the transmitted light becomes lower than the threshold THb, the control circuit 20 can determine the occurrence of the transmission line disconnection and shut down the backward excitation light source 21.

Figure 7:
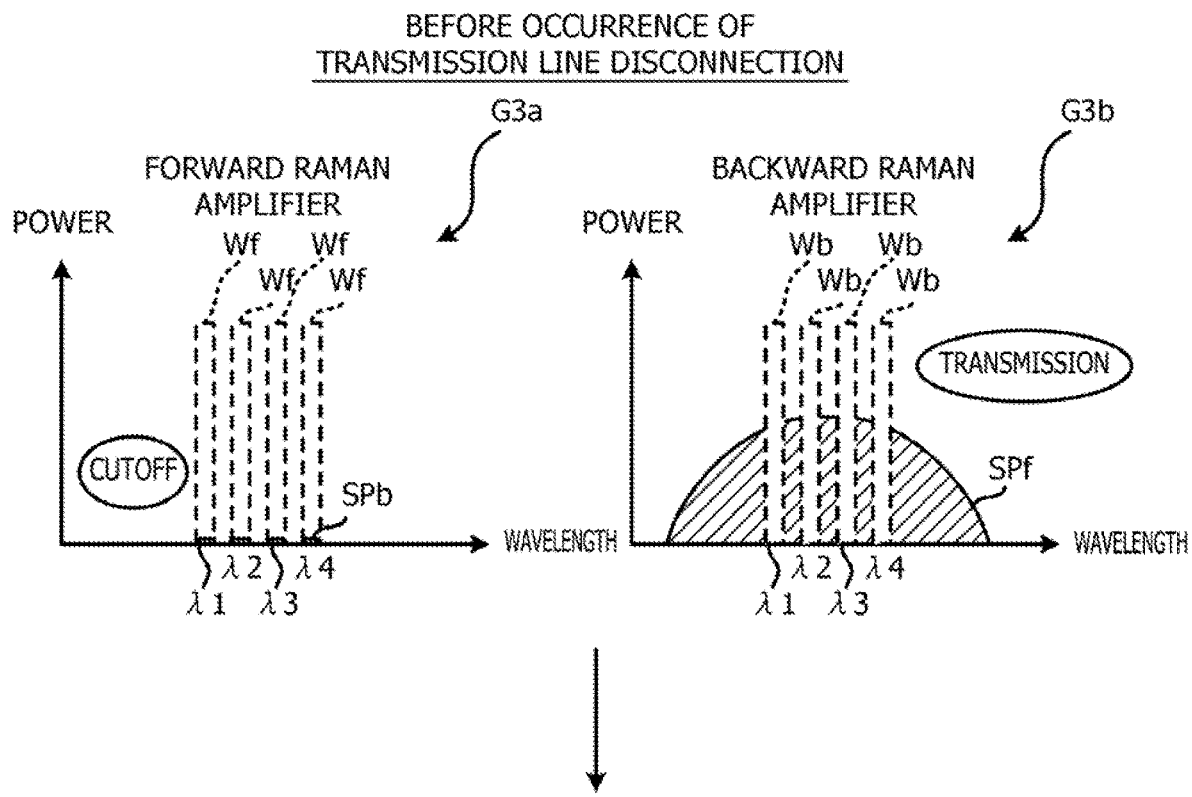
FIG. 7 is a spectrum diagram illustrating operation of optical fitters in the embodiment.
Figure 7:
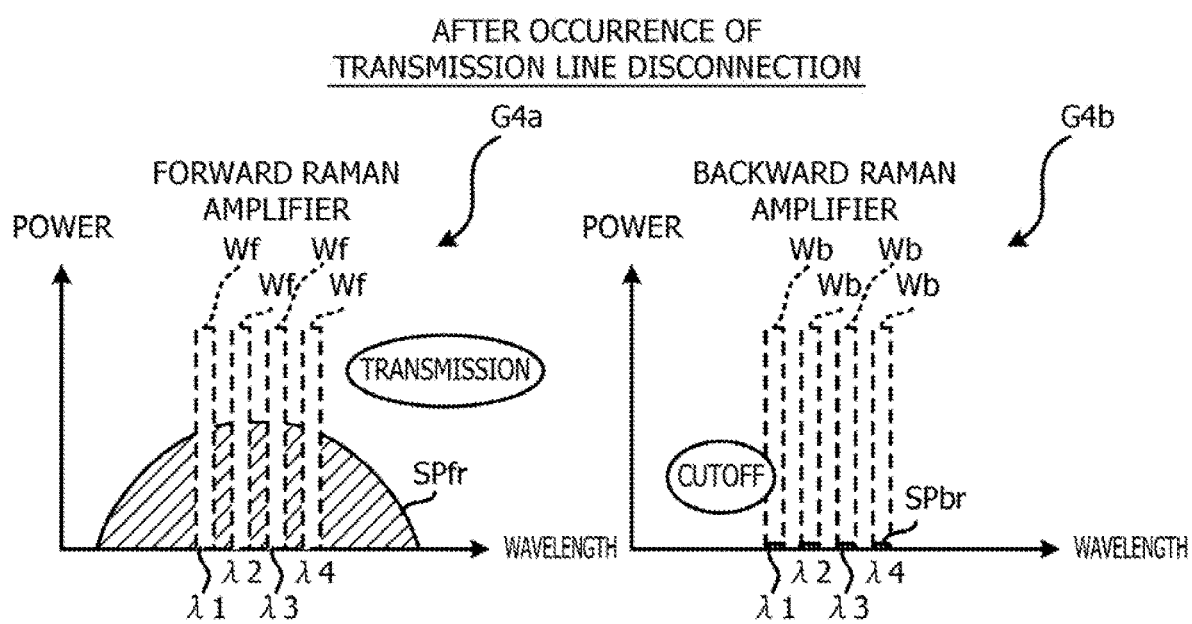

FIG. 7 is a spectrum diagram illustrating operation of optical filters 14 and 24 in the embodiment. In FIG. 7, the horizontal axis represents the wavelength and the vertical axis represents the power.

Reference numeral G3a indicates the operation of the optical filter 14 of the forward Raman amplifier 1 before the occurrence of the transmission line disconnection, and reference numeral G3b indicates the operation of the optical filter 24 of the backward Raman amplifier 2 before the occurrence of the transmission line disconnection.

In the present example, the optical filter 24 of the backward Raman amplifier 2 has a cutoff band Wb including four discontinuous regions of center wavelengths $\lambda 1$, $\lambda 2$, $\lambda 3$, and $\lambda 4$ having a fixed bandwidth. For example, the optical filter 24 of the backward Raman amplifier 2 has the cutoff band Wb that matches a wavelength band SFb of the backward excitation light.

Therefore, the cutoff band Wb of the optical filter 24 partially overlaps with a wavelength band SPf of the forward excitation light in the vicinities of the center wavelengths $\lambda 1$, $\lambda 2$, $\lambda 3$, and $\lambda 4$, but there are also some regions where the cutoff band Wb does not overlap with the wavelength band SPf. Therefore, the optical filter 24 transmits an optical component of the forward excitation light input from the forward Raman amplifier 1, the optical component not overlapping with a cutoff band Wf, when the transmission line disconnection does not occur.

Therefore, the PD 25 detects the power Pb' of the forward excitation light, which is the transmitted light. Therefore, when the power Pb' of the transmitted light of the optical filter 24 is higher than the predetermined threshold THb, the control circuit 20 does not detect the transmission line disconnection and maintains the output of the backward excitation light.

Furthermore, since the cutoff band Wf of the optical filter 14 of the forward Raman amplifier 1 matches a wavelength band SPb of the backward excitation light as in the comparative example, the optical filter 14 cuts off the backward excitation light. Therefore, power Pf of the transmitted light of the optical filter 14 becomes substantially 0. Therefore, when the transmission line disconnection has not occurred, the control circuit 10 does not detect the transmission line disconnection and maintains the output of the forward excitation light in a case where the power Pf of the transmitted light of the optical filter 14 is equal to or less than a threshold THf.

Reference numeral G4a indicates the operation of the optical filter 14 of the forward Raman amplifier 1 after the occurrence of the transmission line disconnection, and reference numeral G4b indicates the operation of the optical filter 24 of the backward Raman amplifier 2 after the occurrence of the transmission line disconnection. When the transmission line disconnection occurs, a reflected light of the forward excitation light is input from the failure part to the forward Raman amplifier 1, and the reflected light of the backward excitation light is input from the failure part to the backward Raman amplifier 2, due to the Fresnel reflection.

The optical filter 14 of the forward Raman amplifier 1 transmits an optical component (see the shaded parts) of the reflected light of the forward excitation light as in the comparative example, the optical component not overlapping with the cutoff band Wf. The PD 15 detects a part of the power Pf of the reflected light of the forward excitation light as transmitted light. When the power Pf of the transmitted light of the optical filter 14 is higher than the threshold THf, the control circuit 10 detects the transmission line disconnection and cuts off the forward excitation light.

Furthermore, since the cutoff band Wb of the optical filter 24 of the backward Raman amplifier 2 matches the wavelength band SPbr of the reflected light of the backward excitation light, the optical filter 24 does not transmit the reflected light of the backward excitation light. Therefore, the power Pf of the transmitted light of the optical filter 24 becomes substantially 0. Therefore, when the transmission line disconnection occurs, the control circuit 20 can detect the transmission line disconnection according to the decrease in the power Pf of the transmitted light of the optical filter 24 from the power of the forward excitation light before the occurrence of the transmission line disconnection, and can cut off the backward excitation light.

As described above, the forward Raman amplifier 1 stops the output of the forward excitation light in the case where the power Pf of the transmitted light of the optical filter 14 detected by the PD 15 is higher than the threshold THf. The backward Raman amplifier 2 stops the output of the backward excitation light when the power of the transmitted light of the optical filter 24 detected by the PD 25 is reduced from the power of the forward excitation light transmitted through the optical filter 24 (refers to the shaded parts in the reference numeral G3b). As an example, the backward Raman amplifier 2 stops the output of the backward excitation light in the case where the power of the transmitted light of the optical filter 24 is lower than the threshold THb.

Therefore, the forward Raman amplifier 1 can detect the transmission line disconnection and cut off the forward excitation light in response to the increase in the power Pf of the transmitted light of the optical filter 14 due to the input of the reflected light of the forward excitation light from the failure part at the time of occurrence of the transmission line disconnection. Furthermore, the backward Raman amplifier 2 can detect the transmission line disconnection and cut off the backward excitation light in response to the decrease in the power Pb' of the transmitted light from the optical filter 14 as compared with the power before the occurrence of the transmission line disconnection, with the stop of the input of the forward excitation light from the forward Raman amplifier 1 at the time of occurrence of the transmission line disconnection.

(Operation of Control Circuits 10 and 20)

Figure 8:
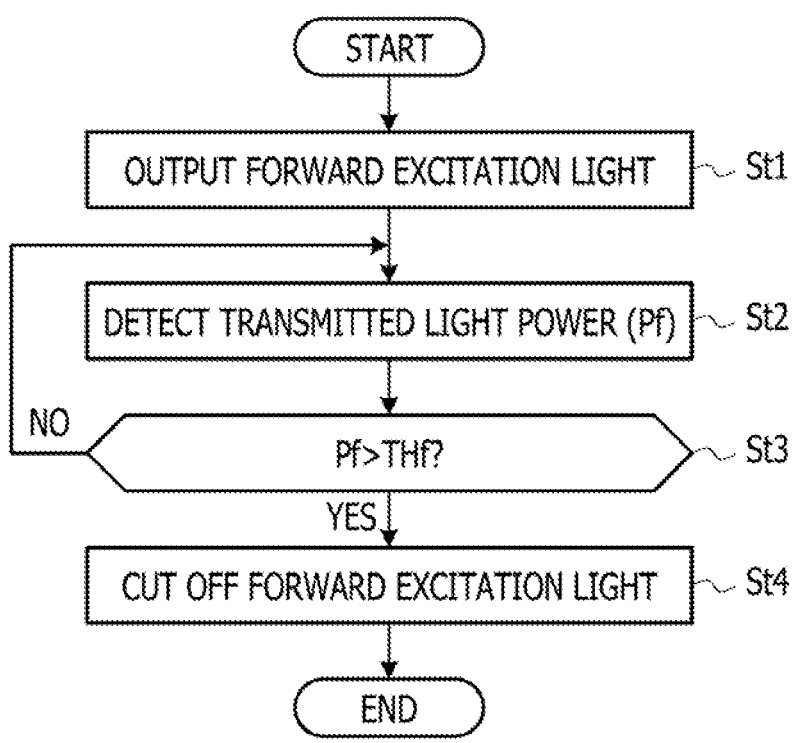
FIG. 8 is a flowchart illustrating an example of an operation of a control circuit of a forward Raman amplifier.

FIG. 8 is a flowchart illustrating an example of an operation of the control circuit 10 of the forward Raman amplifier 1. The control circuit 10 starts the output of the forward excitation light by outputting a control signal Sf for starting light emission to the forward excitation light source 11 (step St1).

Next, the control circuit 10 detects the power Pf of the transmitted light of the optical filter 14 from the output signal of the PD 15 (step St2). Next, the control circuit 10 compares the power Pf of the transmitted light with the threshold THf (step St3). When the power Pf of the transmitted light is equal to or less than the threshold THf (No in step St3), the control circuit 10 determines that transmission line disconnection has not occurred and detects the power Pf of the transmitted light of the optical filter 14 again (Step St2).

When the power Pf of the transmitted light is higher than the threshold THf (Yes in step St3), the control circuit 10 determines that the transmission line disconnection has occurred and outputs the control signal Sf for stopping light emission to the forward excitation light source 11 to cut off the forward excitation light (step St4). The control circuit 10 thus operates.

Figure 9:
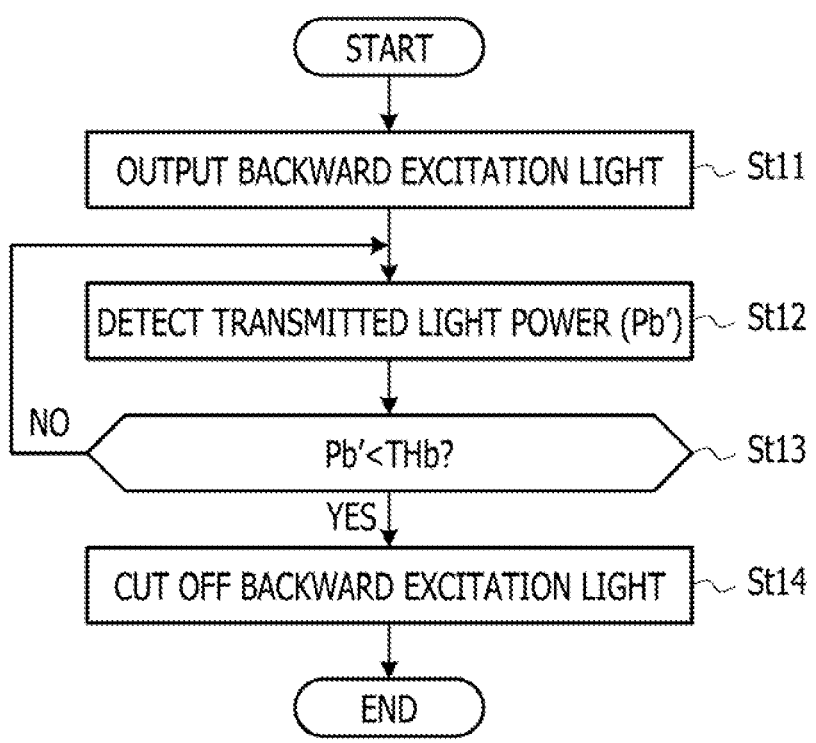
FIG. 9 is a flowchart illustrating an example of an operation of a control circuit of a backward Raman amplifier.

FIG. 9 is a flowchart illustrating an example of an operation of the control circuit 20 of the backward Raman amplifier 2. The control circuit 20 starts the output of the backward excitation light by outputting the control signal Sb for starting light emission to the backward excitation light source 21 (step St11).

Next, the control circuit 20 detects the power Pb' of the transmitted light of the optical filter 24 from the output signal of the PD 25 (step St12). Next, the control circuit 20 compares the power Pb' of the transmitted light with the threshold THb (step St13). When the power Pb' of the transmitted light is equal to or larger than the threshold THb (No in step St13), the control circuit 20 determines that transmission line disconnection has not occurred, and detects the power Pb' of the transmitted light of the optical filter 24 again (Step St12).

When the power Pb' of the transmitted light is lower than the threshold THb (Yes in step St13), the control circuit 20 determines that the transmission line disconnection has occurred, and outputs the control signal Sb for stopping light emission to the backward excitation light source 21 to cut off the backward excitation light (step St14). The backward excitation light source 21 may determine that the power Pb' of the transmitted light has become 0 by setting the appropriate threshold THb and cut off the backward excitation light.

As a result, the control circuit 20 can determine the occurrence of the transmission line disconnection with higher accuracy and cut off the backward excitation light. Note that the means for determining the occurrence of the transmission line disconnection is not limited thereto. For example, the control circuit 20 may determine the occurrence of the transmission line disconnection on the condition that the power Pf of the transmitted light is reduced by a predetermined value or more from before the occurrence of the transmission line disconnection. The control circuit 20 thus operates.

As described above, the control circuit 10 of the forward Raman amplifier 1 causes the forward excitation light source 11 to stop the output of the forward excitation light when the power Pf of the transmitted light detected by the PD 15 is higher than the threshold THf. Furthermore, the control circuit 20 of the backward Raman amplifier 2 causes the backward excitation light source 21 to stop the output of the backward excitation light when the power Pb' of the transmitted light detected by the PD 25 decreases from the power of the forward excitation light transmitted through the optical filter 14.

Therefore, the forward Raman amplifier 1 and the backward Raman amplifier 2 autonomously control the forward excitation light source 11 and the backward excitation light source 21 by the control circuits 10 and 20, respectively, without using an external control device as to be described below, and can cut off the forward excitation light and the backward excitation light. Note that the control circuit 10 is an example of a first control unit, and the control circuit 20 is an example of a second control unit.

(Configuration of Another Embodiment of Bidirectional Raman Amplification Device)

Figure 10:
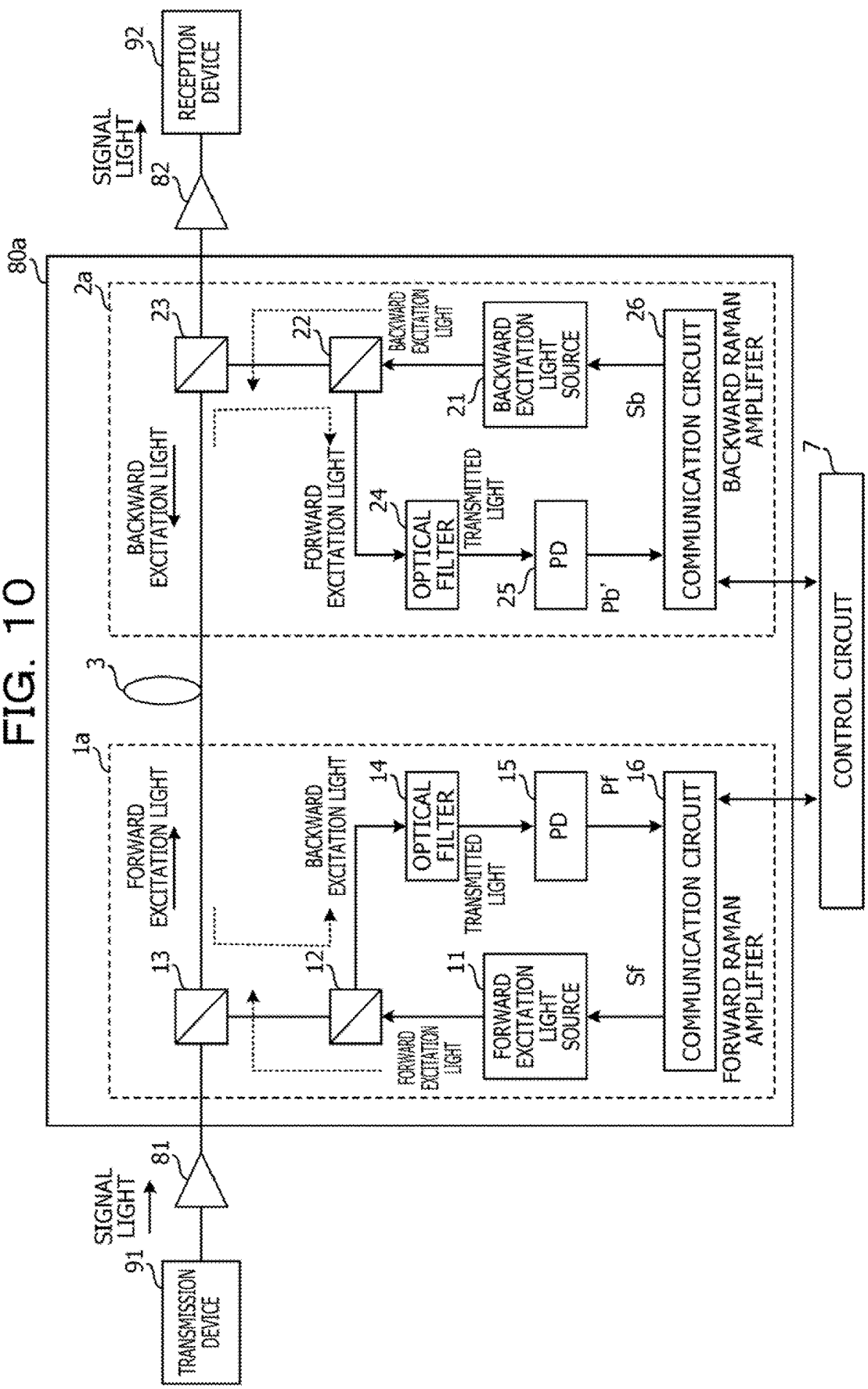
FIG. 10 is a configuration diagram illustrating another example of the bidirectional Raman amplification device.

FIG. 10 is a configuration diagram illustrating another embodiment of a bidirectional Raman amplification device 80a. The bidirectional Raman amplification device 80a includes a forward Raman amplifier 1a and a backward Raman amplifier 2a.

The forward Raman amplifier 1a is different from the forward Raman amplifier 1 in including a communication circuit 16 instead of the control circuit 10. Furthermore, the backward Raman amplifier 2a is different from the backward Raman amplifier 2 in including a communication circuit 26 instead of the control circuit 20. The communication circuits 16 and 26 are connected to a control device 7 via, for example, a local area network (LAN) line. The communication circuits 16 and 26 notify the control device 7 of power Pf and Pb' of transmitted lights detected by PDs 15 and 25.

The control device 7 is, for example, a network management device, and controls the forward Raman amplifier 1a and the backward Raman amplifier 2a. The control circuit 10 includes the functions of the control circuits 10 and 20, and outputs control signals Sf and Sb to a forward excitation light source 11 and a backward excitation light source 21 via the communication circuit, respectively.

The control device 7 performs shutdown control of the forward excitation light source 11 and the backward excitation light source 21 according to the power Pf and Pb' of the transmitted lights. The control device 7 causes the forward excitation light source 11 to stop output of a forward excitation light when the power Pf of the transmitted light detected by the PD 15 is higher than a threshold THf. Furthermore, the control device 7 causes the backward excitation light source 21 to stop output of a backward excitation light when the power Pb' of the transmitted light detected by the PD 25 decreases from power of the forward excitation light transmitted through an optical filter 14.

Since the forward Raman amplifier 1a and the backward Raman amplifier 2a of the present embodiment do not have the control circuits 10 and 20, the configuration is smaller than that of the forward Raman amplifier 1 and the backward Raman amplifier 2 illustrated in FIG. 1.

The embodiments described above are preferred examples. However, the embodiments are not limited to this, and a variety of modifications may be made without departing from the scope of the embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical amplification device comprising:
   a first Raman amplifier configured to output a first excitation light to a transmission line in a same direction as a signal light transmitted in the transmission line to amplify the signal light; and
   a second Raman amplifier configured to output a second excitation light to the transmission line in an opposite direction to the signal light to amplify the signal light, wherein
   a first wavelength band of the first excitation light includes a second wavelength band of the second excitation light and is wider than the second wavelength band,
   the first Raman amplifier includes:
      a first optical filter configured to cut off the second wavelength band from the second excitation light and/or a first reflected light of the first excitation light, which are input from the transmission line, and
      a first detector configured to detect first power of a first transmitted light transmitted through the first optical filter,
   the second Raman amplifier includes:
      a second optical filter configured to cut off the second wavelength band from the first excitation light and/or a second reflected light of the second excitation light, which are input from the transmission line, and
      a second detector configured to detect second power of a second transmitted light transmitted through the second optical filter, the first Raman amplifier stops output of the first excitation light when the first power is higher than a threshold, and the second Raman amplifier stops output of the second excitation light when the second power is reduced from power of the first excitation light transmitted through the second optical filter.

2. The optical amplification device according to claim 1, wherein the first Raman amplifier further includes:
  a first excitation light source configured to output the first excitation light, and
  a first controller configured to cause the first excitation light source to stop output of the first excitation light when the first power is higher than the threshold, and the second Raman amplifier includes:
  a second excitation light source configured to output the second excitation light, and
  a second controller configured to cause the second excitation light source to stop output of the second excitation light when the second power is reduced from the power of the first excitation light transmitted through the second optical filter.

3. The optical amplification device according to claim 1, wherein the second Raman amplifier stops output of the second excitation light when the power of the second transmitted light detected by the second detection unit becomes 0.

4. The optical amplification device according to claim 1, wherein
the first Raman amplifier includes:
  a light guide configured to guide the first excitation light to the transmission line, and guide the second excitation light and the first reflected light from the transmission line to the first optical filter.

5. The optical amplification device according to claim 1, wherein
the second Raman amplifier further includes
  a light guide configured to guide the second excitation light to the transmission line, and guide the first excitation light and the second reflected light from the transmission line to the second optical filter.

6. The optical amplification device according to claim 1, wherein
the second wavelength band includes at least same bandwidth as the signal light on a short wavelength side of a wavelength band of the signal light.

7. An optical amplification method comprising:
outputting, by a first Raman amplifier, a first excitation light to a transmission line in a same direction as a signal light transmitted in the transmission line to amplify the signal light; and outputting, by a second Raman amplifier, a second excitation light to the transmission line in an opposite direction to the signal light to amplify the signal light, wherein a first wavelength band of the first excitation light includes a second wavelength band of the second excitation light and is wider than the second wavelength band, the first Raman amplifier includes:
  a first optical filter configured to cut off the second wavelength band from the second excitation light and/or a first reflected light of the first excitation light, which are input from the transmission line, and
  a first detector configured to detect first power of a first transmitted light transmitted through the first optical filter, the second Raman amplifier includes:
  a second optical filter configured to cut off the second wavelength band from the first excitation light and/or a second reflected light of the second excitation light, which are input from the transmission line, and
  a second detector configured to detect second power of a second transmitted light transmitted through the second optical filter, the first Raman amplifier stops output of the first excitation light when the first power is higher than a threshold, and the second Raman amplifier stops output of the second excitation light when the second power is reduced from power of the first excitation light transmitted through the second optical filter.

8. The optical amplification method according to claim 7, wherein the second Raman amplifier stops output of the second excitation light when the power of the second transmitted light detected by the second detection unit becomes 0.

9. The optical amplification method according to claim 7, wherein
the second wavelength band includes at least same bandwidth as the signal light on a short wavelength side of a wavelength band of the signal light.

* * * * *